Patented Jan. 20, 1953

2,626,203

UNITED STATES PATENT OFFICE 2,626,203

METHOD OF MAKING ZIRCONIUM TETRACHLORIDE

Warren B. Blumenthal, Niagara Falls, N. Y., assignor, by mesne assignments, to the United States of America as represented by the United States Atomic Energy Commission No Drawing. Application March 4, 1952, Serial No. 274,835

8 Claims. (Cl. 23—87)

This invention relates to the production of elemental zirconium and more particularly to an improved method of converting zirconium tetrafluoride into zirconium tetrachloride, which can in turn be readily converted into elemental zirconium by known methods.

It has been proposed that elemental zirconium be made from zirconium oxide by a process that includes the steps dissolving the oxide in aqueous hydrofluoric acid, treating the resulting solution with ammonium fluoride to precipitate zirconium ammonium fluoride therefrom, heating the precipitate to drive off ammonium fluoride and recover relatively pure zirconium tetrafluoride, converting the zirconium tetrafluoride to the tetrachloride, and reducing the tetrachloride with a suitable reducing agent, such as magnesium metal, to produce elemental zirconium. The present invention is particularly directed to a method of converting zirconium tetrafluoride to the tetrachloride and hence is especially well-suited for use in a zirconium recovery process such as that outlined above.

It is a general object of the invention to provide an improved method of converting zirconium tetrafluoride into zirconium terachloride. It is another object of the invention to provide a method of this type that gives a high yield of the tetrachloride. It is still another object of the invention to provide such a process that is easy to carry out and employs relatively inexpensive reagents. Other objects of the invention will be in part obvious and in part pointed out hereafter.

In accordance with the present invention zirconium tetrafluoride is caused to react metathetically with magnesium chloride to produce zirconium tetrachloride as indicated in the following equation:

$$ZrF_4 + 2MgCl_2 \rightarrow ZrCl_4 + 2MgF_2$$

The reaction may be conveniently carried out by mixing the zirconium fluoride and magnesium chloride in finely divided form in approximately stoichiometrical proportions and heating the mixture to a temperature sufficient to volatilize the $ZrCl_4$ and drive it off as a vapor. It has been found that the mixture should be heated to a temperature of 350° to 900° C. As indicated in the table below the yield obtained varies as a function of the heating temperature.

Table

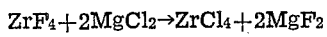

| Temp., ° C. | Percent Yield |
| --- | --- |
| 490 | 55 |
| 700 | 71 |
| 750 | 92.5 |
| 900 | 66 |

From the foregoing table it is apparent that a relatively high yield is obtained at a temperature of about 750° C. and accordingly this is the preferred temperature for carrying out the present process. The time of heating does not appear to be particularly critical and a heating period of 1 to 2 hours has been found satisfactory. The tetrachloride vapors are preferably removed from the reaction mixture by passing a stream of an inert gas such as helium thereover. Condensation of the vapors to recover zirconium tetrachloride in solid form can be effected in any suitable and well-known manner.

It is not essential that the reaction be carried out between the reactants in finely divided form, since various reaction media can be used. For example in an alternative embodiment of the present method the $MgCl_2$ is dissolved in molten stannous chloride and the $ZrF_4$ added thereto. In this embodiment the stannous chloride solution preferably contains about 25% by weight of $MgCl_2$ and about one mol of $ZrF_4$ for each 2 mols of $MgCl_2$. The mixture or solution is heated to a temperature above 350° C., preferably about 540° C., to drive off $ZrCl_4$ which is condensed and recovered.

In order to point out more fully the nature of the present invention the following illustrative example is given of a specific mode of carrying out the invention:

A mixture of 10.7 parts by weight of $ZrF_4$ and 12.2 parts by weight of $MgCl_2$ was prepared and introduced into a closed reaction chamber. The reaction chamber was externally heated to raise the temperature of the reaction mixture to about 750° C., at which temperature the mixture had the consistency of a fluid paste. Helium was introduced into the chamber in such manner as to cause a stream of helium to flow slowly across the surface of the reaction mass, and zirconium tetrachloride vapors evolved from the mass were swept along by the helium stream. The resulting gas-vapor mixture was withdrawn from the reaction chamber and passed to a condenser wherein it was cooled to cause the $ZrCl_4$ to deposit in solid form. At the end of about 1½ hours the quantity of deposited $ZrCl_4$ was measured and the yield calculated to be 92.5%.

From the foregoing description it is apparent that the present method permits attainment of the several objects set forth at the beginning of this specification. Thus the method is simple and relatively inexpensive to carry out and gives an exceptionally high yield of the desired product. It is of course to be understood that the specific example given above is illustrative only and that numerous changes can be made therein without departing from the spirit of the invention as set forth in the appended claims.

I claim:

1. The method of making zirconium tetrachloride which comprises heating a mixture of zirconium tetrafluoride and magnesium chloride to vaporize zirconium tetrachloride therefrom, and condensing the vapors thus formed to recover solid zirconium tetrachloride.

2. The method of making zirconium tetrachloride which comprises heating a mixture of zirconium tetrafluoride and magnesium chloride at a temperature of 350° to 900° C. to vaporize zirconium tetrachloride therefrom, and condensing the vapors thus formed to recover solid zirconium tetrachloride.

3. The method of making zirconium tetrachloride which comprises heating a mixture of zirconium tetrafluoride and magnesium chloride containing approximately two mols of the chloride per mol of fluoride at a temperature of 350° to 900° C. to vaporize zirconium tetrachloride therefrom, and condensing the vapors thus formed to recover solid zirconium tetrachloride.

4. A method according to claim 3 and wherein the heating of the mixture is carried out at about 750° C. for about 1½ hours.

5. A method according to claim 3 and wherein the mixture is heated in an atmosphere of helium.

6. The method of making zirconium tetrachloride which comprises dissolving magnesium chloride in a bath of molten tin chloride, mixing zirconium tetrafluoride with the resulting solution, heating the mixture at a temperature of 350° to 900° C. to vaporize zirconium tetrachloride therefrom, and condensing the vapors thus formed to recover solid zirconium tetrachloride.

7. A method according to claim 6 and wherein the heating of the mixture is carried out at about 540° C.

8. A method according to claim 7 and wherein the tin chloride solution is prepared by adding about 25% by weight of magnesium chloride thereto and about .5 mol of zirconium tetrafluoride is mixed with the solution per mol of dissolved magnesium chloride.

WARREN B. BLUMENTHAL.

No references cited.